Feb. 6, 1968  J. O. KING, JR  3,367,228
FASTENER WITH IMPROVED LOCKING MEANS
Filed Jan. 12, 1966  5 Sheets-Sheet 1
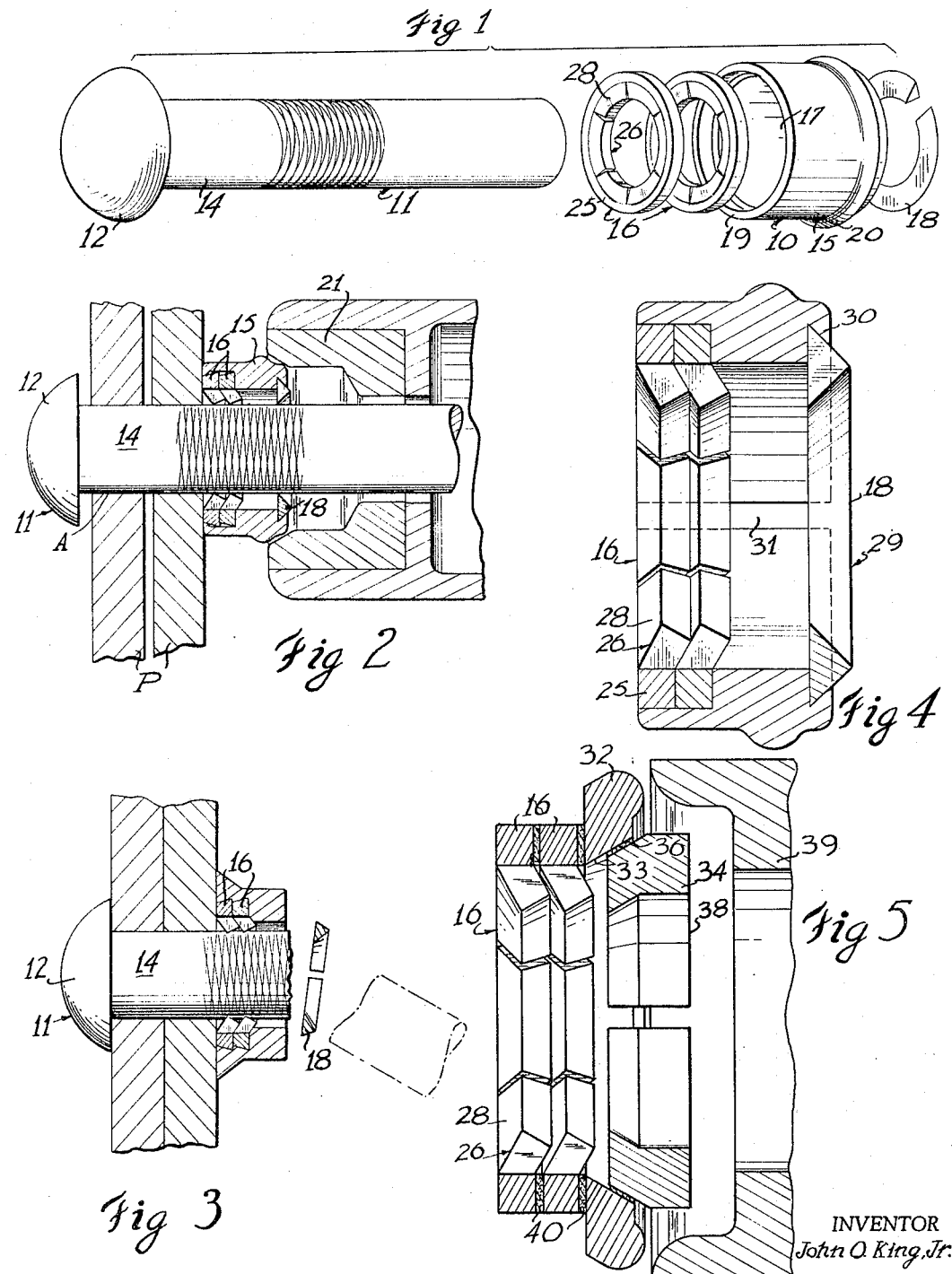
INVENTOR
John O. King, Jr.
Newton, Hopkins,
Jones & Ormsby
BY
ATTORNEYS Feb. 6, 1968  J. O. KING, JR  3,367,228
FASTENER WITH IMPROVED LOCKING MEANS
Filed Jan. 12, 1966  5 Sheets-Sheet 3

United States Patent Office 3,367,228
Patented Feb. 6, 1968

3,367,228
FASTENER WITH IMPROVED LOCKING MEANS
John O. King, Jr., 110 Lake Forrest Lane,
Atlanta, Ga. 30305
Filed Jan. 12, 1966, Ser. No. 520,167
3 Claims. (Cl. 85—7)

ABSTRACT OF THE DISCLOSURE

A threadless locking bolt in combination with a deformable, bolt engaging collar for use in securing together a plurality of workpieces having aligned openings therein to receive the bolt.

---

This invention relates generally to a fastener for use in attaching together a plurality of workpieces having alignable apertures therethrough and more particularly to a fastener comprising a locking bolt insertable through said apertures and locking means for retaining the locking bolt in said aperture.

Many fasteners using a locking bolt and a collar to fasten workpieces together have been available in the past. These prior art collars were made of malleable material and were capable of being swaged around the locking bolt so as to hold it in place. This swaging operation always required a force on the collar radially inward toward the centerline of the locking bolt to deform the collar around the bolt and also a force on the collar parallel to the centerline of the bolt in order to maintain the bolt in tension as the collar is swaged therearound.

Other prior art fasteners have combined the malleable collar with a hardened metal contractible sleeve insert. The insert was placed inside the collar and had a length substantially equal that of the collar so that when the collar was swaged, it forced the insert which was usually split to permit contraction thereof to contract and engage the locking bolt. Since the insert was usually harder than the metal of the locking bolt, gripping teeth provided on the inside of the insert were forced into the bolt and served to hold the collar and insert in place.

Since a substantial amount of malleable metal was required to insure that the prior art collars would hold the locking bolt in place, the weight of the collar, although being less than that of a nut, was enough to become significant in applications where weight must be kept at a minimum. The weight of the fastener is very critical in applications such as air frame structures since any weight saving in the structure is reflected in additional payload that may be carried in the air frame. Moreover, since the weight of the collar is approximately the same when the insert is used therewith, the overall weight of the collar and insert assembly is greater than that when the collar only is used.

Prior art collars and sleeve inserts have had a standard length for each size of locking bolt. This has resulted in requiring that the same amount of material be used to lock the locking bolt in place regardless of the type and amount of force applied to the bolt. The result, then, is that prior art collars and sleeve inserts have, many times, increased the weight of a structure, not because of the strength of the material required the amount of material used, but because each standard collar was required to have sufficient strength to stand the maximum load that could be exerted on the locking bolt and collar in any load situation.

The manufacture of prior art collars and sleeve inserts required complex casting and/or machining to achieve the desired shape for use on a locking bolt. This is especially true for the insert since the configuration of its inside peripheral surface must be capable of engaging the locking bolt and its outside surface must be capable of engaging the collar to hold it around the insert. Moreover, since the inserts must be hardened in order to grip the locking bolt, the heat treating operation must be conducted after the collar has been cast and/or machined.

The present invention overcomes these and other problems associated with prior art fasteners in that the weight of the locking assembly is much less than that of prior art assemblies and may be further lessened depending on the amount of axial force exerted on the locking bolt thereby assuring minimum weight at all times. The fastener is locked in place by exerting a force parallel to the centerline of the locking bolt on the locking assembly which serves to simplify the locking operation. Moreover, that portion of the locking assembly that grips the locking bolt may be easily manufactured in its finished form by a simple operation such as stamping, and a standard fastener may be used with varying thickness of workpieces.

The invention includes a locking assembly including a plurality of washers therein, the locking assembly being insertable over a locking bolt and the washers being capable of gripping the locking bolt upon the application of a force on the locking assembly substantially parallel to the centerline of the locking bolt. The washers may be any of a plurality of configurations and still be effective to grip the bolt upon application of the above-mentioned force on the locking assembly.

The weight of the washers needed for each load application is always substantially less than that of prior art locking assemblies. Moreover, the number of washers may be easily varied so that each load situation may be satisfied without the necessity including unnecessary washers in some applications. This results in a substantial weight saving in the usual application of the fasteners.

These and other features and advantages of the present invention will become more apparent upon consideration of the following specification and accompanying drawings wherein like characters of reference designate the corresponding parts throughout and in which:

FIG. 1 is an exploded perspective view of a fastener embodying the invention;

FIG. 2 is a cross-sectional view of that embodiment of the invention shown in FIG. 1 installed in workpieces and just prior to the locking of the fastener in place on the locking bolt;

FIG. 3 is a cross-sectional view of that embodiment of the invention shown in FIG. 1 after it has been locked in place on the locking bolt;

FIG. 4 is a cross-sectional view of a modification of the locking assembly shown in FIG. 1;

FIG. 5 is a cross-sectional view of a second modification of the locking assembly of FIG. 1;

Figure 6:
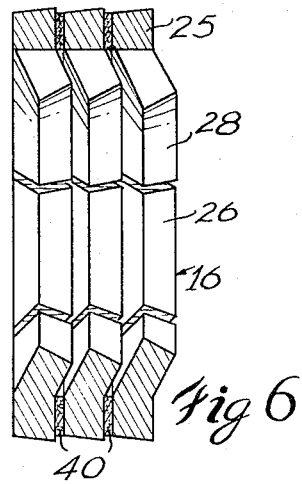
FIG. 6 is a cross-sectional view of a third modification of locking assembly shown in FIG. 1.

These figures and the following specification disclose several specific embodiments of the invention, however, it is to be understood that the inventive concept is not limited to the details disclosed herein since it may be embodied in other equivalent forms.

The first embodiment of the invention is shown in FIGS. 1 and 3 and comprises generally a locking assembly 10 to be used in conjunction with a locking bolt 11 with a head 12 and a shank 14 to form a fastener to attach together a plurality of workpieces P having aligned or alignable apertures A therethrough. The locking assembly 10 includes a cylindrical malleable collar 15 carrying a plurality of washers 16 and a cutting ring 18 within the passage 17 therethrough. The collar 15 has an outside configuration substantially the same as that of conventional collars for use on conventional locking bolts, a rear bearing surface 19 and a front preloading portion 20. The rear bearing surface 19 contacts the side of the work pieces P opposite the head 12 and the preload portion 20 contacts an appropriate anvil 21 of a conventional lockbolt gun (not shown).

Extending from the rear bearing surface 19 toward the front portion 20 is an annular recess 22. The recess 22 also opens into the passage 17 and terminates approximately midway the length of the collar 15 to form a bearing shoulder 24. The washers 16 are carried within the recess 22 adjacent the bearing surface 19.

The washers 16 are similar to the commercially available self-locking washers and each has a bearing portion 25 and a locking portion 26. The bearing portion 25 is effective to lie flat against one side of a workpiece P as shown in FIG. 2 and the locking portion 26 is integral with the inner periphery of the bearing portion 25. The locking portion 26 has a conical shape so that it extends inwardly from the bearing portion 25 and at angle thereto. The locking portion 26 is segmented so that each segment 28 may be resiliently urged outwardly and the inside diameter thereof is slightly less than the diameter of the shank 14 of the locking bolt 11 with which the washers 16 are to be used. Therefore, the segments 28 flex outwardly and permit the washer 16 to slide along the shank 14 under a force parallel to centerline of the shank 14 in that direction opposite to the direction in which the locking portion 26 protrudes from the washer 16. It will be noted that upon forcing the washer 16 in that direction opposite to that set forth above causes the segments 28 to dig into the surface of the shank 14 and lock the washer 16 onto the bolt 11.

The cutting ring 18 is carried at the end of the collar 11 that is to be placed furthest from the workpieces P to be fastened together and is effective to contact the anvil 21 of a conventional swaging gun 22 during the latter stages of the swaging operation in order to notch the bolt 11 sufficiently to cause it to fracture at the notch.

FIG. 2 shows the bolt 11 inserted through two workpieces P with the locking assembly 10 inserted over the shank 14 on that side of the workpieces P opposite the head 12 of the bolt 11. A conventional swaging gun 22 is inserted over the extending end of the shank 14 and the anvil 21 is in that position in which it starts to pre-load the bolt 11.

As the swaging operation progresses, the anvil 21 forces the collar 15 along the bolt 11 and, in doing so, forces the locking segments 28 to flex outwardly and slip along the shank 14. When the bolt 11 is preloaded, the collar 15 swages in conventional manner. As the swaging operation reaches the latter stages thereof and the anvil 21 is almost bearing against the workpieces P, a conical portion thereof extends inwardly sufficiently to contact the outer edge of the cutting ring 18 and is effective to notch the bolt 11 by reducing the inside diameter of the ring 18. This notch is sufficient to cause the bolt 11 to fracture at the notch formed by the cutting ring 18 and serves to terminate the swaging operation. As that portion of the shank 14 is removed after being fractured from the bolt 11, the cutting ring 18 is free to fall from the assembly 10 so that the final assembly shown in FIG. 3 results. When the swaging operation is complete, the bolt 11 is in tension and tries to return to its initial unstressed condition. This causes the shank 14 to try to move in that direction which serves to lock the segments 28 into the shank 14 and prevent the bolt 11 from returning to its unstressed condition.

The washers 16 may be easily stamped from sheet material quite inexpensively and since each of the washers 16 has a specific holding force, the total holding force exerted on the bolt 11 is dependent upon the number of washers 16 used. Therefore, as different loading requirements are encountered, the number of washers 16 may be easily varied to handle the particular requirement so that the weight of the assembly 10 is kept to a minimum.

FIG. 4 illustrates a locking assembly 29 which is a modification of the embodiment of the invention shown in FIG. 1 and utilizes washers 16 with a cutting ring 18 identical to those of the first embodiment of the invention. The washers 16 and cutting ring 18 are carried in a collar 30 which has a longitudinal slit 31 along the circumferential surface thereof. As the collar 30 is swaged, the anvil 21 is effective to force the cutting ring 18 to notch the bolt 11 in the same manner as that disclosed with the locking assembly 10, but the slit 31 renders the collar 30 frangible so that it is broken away as a result of the swaging operation. The removal of the collar 30 from the swaged assembly 29, while it does not reduce the holding force of the washers 16, does substantially decrease the total weight of the installed locking assembly 29.

FIG. 5 discloses a second modification of the first embodiment of the invention which also uses a plurality of locking washers 16. A pre-load ring 32 is used in combination with the washers 16 and a modified cutting ring 34 is used therewith.

The pre-load ring 32 is an annular ring having an outside diameter greater than the outside diameter of the washers 16 and an inside diameter approximately equal to the inside diameter of the bearing portion 25 of the washers 16. The inside peripheral edge 33 of the pre-load ring 32 is conically tapered so that the minimum diameter of the edge 33 is adjacent the bearing portion 25.

The modified cutting ring 34 has a slit therein which renders it contractible and has a cutting edge 35 thereon with an initial or normal inside diameter just greater than that of the locking bolt 11 upon which the assembly is to be used. The cutting ring 34 has a first peripheral bearing surface 36 around the portion thereof that extends within the aperture defined by the inside peripheral edge 33 of the pre-load ring 32, this bearing surface 36 being complementary to the tapered inside peripheral edge 33 of the pre-load ring 32. A second bearing surface 38 is provided on the cutting ring 34 which is effective to engage an installing anvil 39 after a certain amount of pre-load has been exerted on the locking assembly, the surface 38 being on that side of the modified cutting ring 34 opposite that which extends into the aperture formed by the inner peripheral edge 33 of the pre-load ring 32.

The washers 16 are assembled similarly to the washers 16 in the first embodiment of the invention and are held together by an adhesive 40 of any conventional type. The pre-load ring 32 is held onto the washers 16 by an adhesive 40 similar to that which holds the washers 16 together and the cutting ring 34 is also held in place by the adhesive 40. The adhesive 40 is sufficient to hold the assembly prior to installation but is broken as will be explained hereinafter during installation.

As can easily be seen, the anvil 39 contacts the pre-load ring 32 and forces the assembly up on the bolt 11. Since the locking segments 28 are flexible the assembly is allowed to slip along the shank 14 under the action of the anvil 39 on the pre-load ring 32. After the bolt 11 has been pre-loaded sufficiently the anvil 39 starts to deform the pre-load ring 32 which allows the anvil 39 to move upon the locking assembly and engage the second bearing surface 38 of the modified cutting ring 34. This is effective to cause the cutting ring 34 to be forced further inside the pre-load ring 32, and, since the first bearing surface 36 and the inner peripheral edge of the pre-load ring 32 are complementary, the cutting ring 34 is forced to contract thereby notching the shank 14 of the locking bolt 11 in conventional manner. As the bolt 11 is further loaded by the anvil 39, the cutting ring 34 is further contracted so that the bolt 11 is notched enough to cause it to fail at the notch and stop the locking operation.

As the pre-load ring 32 is deformed by the anvil 39, it forces the pre-load ring 32 to move with respect to the edge of the washer 16 so that the adhesive 40 holding the pre-load ring 32 to the washer 16 is broken. Moreover, since the cutting ring 34 is forced to move with respect to the pre-load ring 32, the adhesive 40 holding the pre-load ring 32 to the cutting ring 34 is also broken. Therefore, when the anvil 39 and unused portion of the locking bolt 11 are removed, the modified cutting ring 34 and the pre-load ring 32 drop from the assembly leaving only the plurality of washers 16 engaging the locking bolt 11 and the workpieces P which are held together in the aforementioned manner.

FIG. 6 discloses a plurality of washers 16 according to the first embodiment of the invention which may be installed on a locking bolt (not shown) having a conventional breakneck groove therein. The washers 16 are held together by a suitable adhesive 40 so that they will slide along the bolt 11 toward the head of the bolt but are precluded from being removed from the bolt in the aforementioned manner. Therefore, it can easily be seen that the washers 16 will be forced along the bolt until it is sufficiently pre-loaded to cause the bolt to fracture at the breakneck groove.

Figure 7:
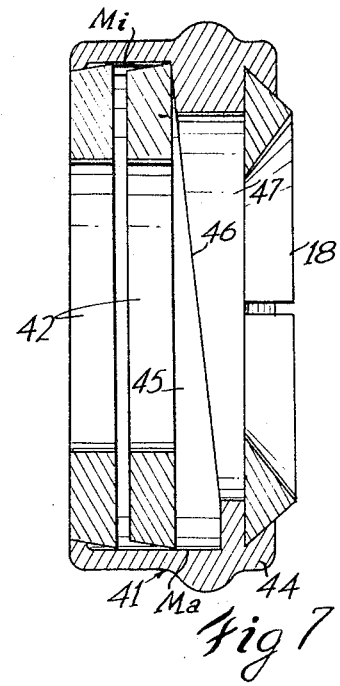
FIG. 7 is a cross-sectional view of a locking assembly used in the second embodiment of the invention.

FIG. 7 discloses a locking assembly 41 which is a second embodiment of the invention utilizing a plurality of flat washers 42 to lock a locking bolt 11 in place. The washers 42 are carried by an annular malleable collar 44, the collar 44 also carrying a cutting ring 18. The collar 44 has an annular recess 45 on that side of the collar to be placed adjacent the workpiece P and is effective to receive the washers 42 therein. The recess 45 opens on the rear side of the collar 44 as well as the inside thereof, has a minimum width M$i$ at one point thereof, and has a maximum width M$a$ diametrically opposite the point of minimum width M$i$. It can easily be seen, then, that a shoulder 46 formed where annular wall of the recess 45 and the cylindrical channel 47 extending through the collar 44 meet is inclined with respect to the rear edge of the collar 44.

The ring 18 is carried by the collar 44 in the same manner as the ring 18 is carried by the collar 15. Therefore, when the locking assembly 41 has been locked in place by swaging, the cutting ring 18 is contracted sufficiently to notch the locking bolt 11 and cause it to fail at the notched portion.

Figure 9:
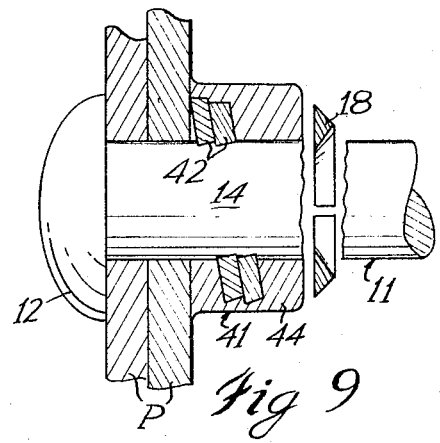
FIG. 9 is a cross-sectional view of the second embodiment of the invention shown locked in place by the locking assembly of FIG. 7.

As the collar 44 is swaged, the material of the collar is forced toward the workpieces P against which the rear side of the collar 44 rests. This causes the washers 42 to be forced back against the workpieces P at one point thereof and away from the workpieces P diametrically opposite thereof, since the angular relationship of the shoulder 46 within the collar 44 exerts a force on the washers 42 in this manner. As the washers 42 are forced in the above particular manner, they engage the bolt 11 and are locked in place thereon. Also, as one portion of the washers 42 are forced away from the porkpieces P, the material of the collar 44 is forced to flow between the workpieces P to be fastened together and the washers 42. This is effective to lock the washers 42 in place and insure that the holding force of the collar 44 on the workpieces P is evenly distributed as is best shown in FIG. 9.

Figure 8:
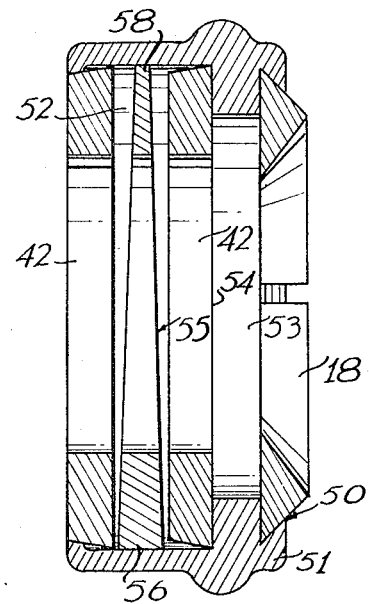
FIG. 8 is a modification of the locking assembly shown in FIG. 7.

A locking assembly 50 which is a modification of the second embodiment of the invention is shown in FIG. 8. This locking assembly 50 uses a pair of washers 52 identical to the washers 42 of the locking assembly 41 of FIG. 7. These washers 42 are carried in a collar 51 similar to the collar 44 of FIG. 7, and also carries a cutting ring 18 at the front thereof in the same manner as the collar 44. An annular recess 52 extends forwardly from the rear side of the collar 51 which bears against the workpieces P and opens onto the passage 53 through the collar 51 so as to form a shoulder 54 parallel to the rear side of the collar 51. The width of the recess 52 is therefore equal at all points therearound and is sufficient to receive the washers 51 therein with a tapered spacer 55 therebetween.

The tapered spacer 55 has an outside and an inside diameter equal to that of the washers 51 and the thickness of the spacer 55 is substantially that of the washers at one point thereabout designated as 56, but has a thickness substantially less than that of the washers 51 at the point designated as 58 diametrically opposite the point of maximum thickness 56. The spacer 55 tapers evenly on both sides thereof between the points of maximum and minimum thicknesses 56 and 58 so that as the collar 55 is swaged, the washers 51 are canted in a manner similar to that shown in FIG. 9 so that they engage the shank 14 and lock the locking bolt 11 in place.

Figure 10:
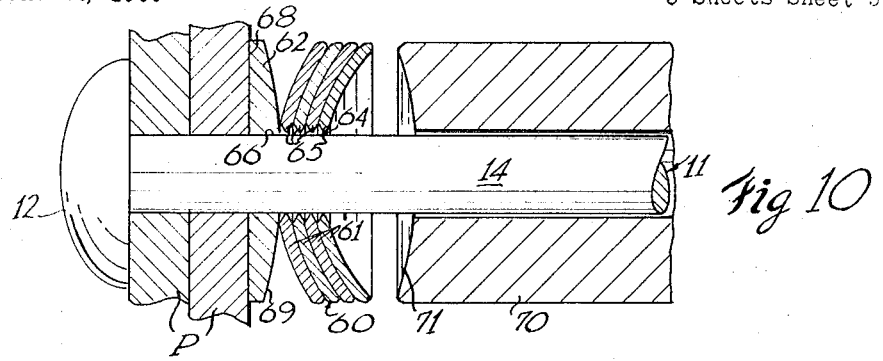
FIG. 10 is a cross-sectional view of a third embodiment of the invention showing the locking assembly therefor just prior to being locked onto the locking bolt.

A locking assembly 60 which is a third embodiment of the invention is shown in FIG. 10 ready to be installed on a locking bolt 11. The assembly 60 comprises a plurality of conical washers 61 in combination with a fulcrum washer 62. The conical washers 61 are of hardened metal and are cup-shaped with an aperture 64 therethrough sufficiently large to allow the washers 61 to be insertable over the locking bolt 11. The washers 61 have a sharpened edge 65 at the aperture 64 therethrough that is effective to engage the locking bolt 11 as shall be explained hereinafter.

The fulcrum washer 62 has an outside diameter substantially equal to that of the conical washers 61 and an aperture 66 therethrough just sufficient to permit the fulcrum washer 62 to be inserted over the locking bolt 11. The fulcrum washer 62 is a toroid generated by rotating a plane cross-section having one flat side and an opposite convex side about a central axis, the flat and convex sides being perpendicular to the central axis. It can easily be seen, then, that the washer 62 has a flat surface 68 to be placed against the workpieces P and a pivoting surface 69 against which the washers 61 rest. The pivot surface 69 of the fulcrum washer 62 will have its particular shape determined by the size and thickness of the conical washers 61 used therewith.

Figure 11:
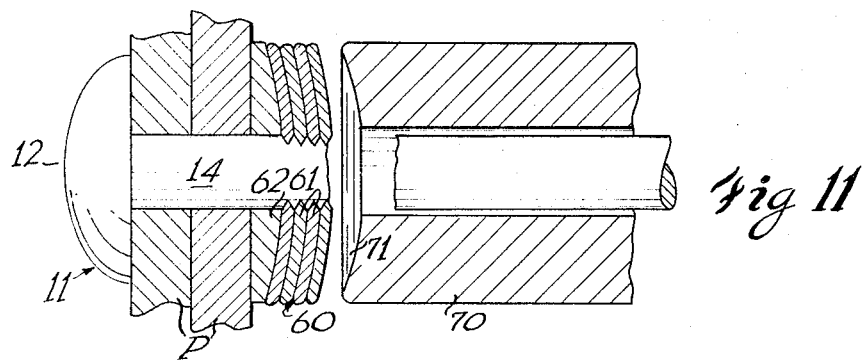
FIG. 11 is a cross-sectional view of that embodiment of the invention shown in FIG. 10 and having the locking assembly locked onto the locking bolt.

To install the locking assembly 60, the fulcrum washer 62 is inserted in the aforementioned manner over the shank 14 of the locking bolt 11 and the conical washers 61 are then inserted over the shank 14 so that the cupped or concave sides thereof face away from the pivot surface 69 of the fulcrum washer 62. An anvil 70 having a concave pressing surface 17 is carried in a conventional lockbolt gun having pulling jaws (not shown) which grip the locking bolt 11 in conventional manner. The anvil 70 is inserted over the extending end of the shank 14 and the saws (not shown) engage the shank 14. As the pulling jaws (not shown) pull the locking bolt 11 and force the anvil 70 toward the workpieces P, the anvil 70 engages the outer edges of the conical washers 61 and force them toward the workpieces P. When the force exerted on the washers 61 by the anvil 70 reaches a predetermined amount, the washers 61 are forced to fold over the fulcrum washer 62 by pivoting on the surface 69 as shown in FIG. 11.

As the washers 61 are folded over the fulcrum washer 62, the outside diameter of the washers 61 increases and the inside diameter thereof decreases. This is effective to cause the sharpened edges 65 on the inside of the washers 61 to engage the locking bolt 11 and exert a force thereon so that the bolt 11 is locked in place. It will be noted that the washers 61, when folded over the fulcrum washer 62, are substantially flat and therefore the inside diameter of the washers 61 are substantially at their smallest dimension. As the washers 61 are folded over the fulcrum washer 62, the point on the pivoting surface 69 about which the washers 61 pivot shifts. This is effective to cause the sharpened inside edges 65 to engage the bolt 11 and then tend to exert an additional pre-load force on the bolt 11 over that exerted on the bolt 11 by the pulling jaws (not shown). This is effective to insure that the bolt 51 is under proper tension when the anvil 70 is removed.

If the initial inside diameter of the washer 61 furthest away from the fulcrum washer 62 is slightly smaller than the inside diameter of the other washers 61 used with this embodiment of the invention, it will be seen that this furthermost washer 61 will be sufficient to notch the shank 14 so that it will fail at this notch. As the shank 14 fails at the notched portion, the locking operation is terminated and the furthermost washer 61 which scored the bolt 11 is released from the bolt 11 so that the remaining washers hold the bolt 11 in place.

It can easily be seen that, since each washer 61 has a specific holding force on the bolt 11, the total holding force on the bolt 11 may be easily varied by varying the number of washers 61 applied to the bolt 11. This serves to reduce the weight of the locking assembly 60 to an absolute minimum when the locking operation is completed.

Figure 12:
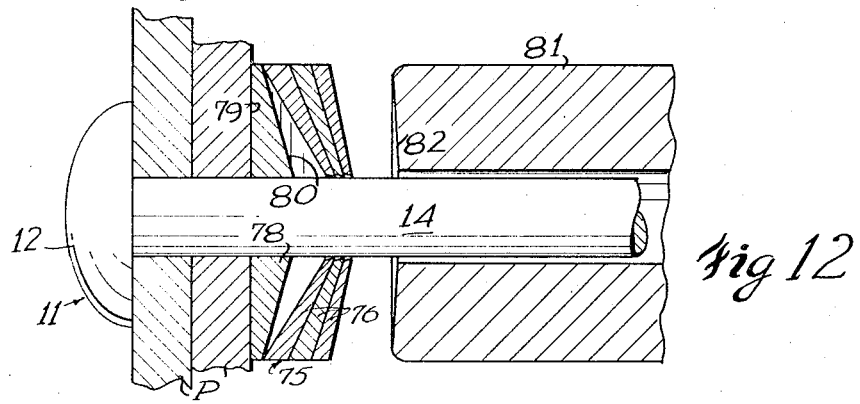
FIG. 12 is a cross-sectional view of a modification of the third embodiment of the invention showing the locking assembly just prior to being locked onto the locking bolt.

A locking assembly 75 which is a modification of the third embodiment of the invention is shown in FIG. 12 and comprises a fulcrum washer 78 and a plurality of conical washers 76 arranged so that the concave or cupped portion of the washers 76 face the workpieces P rather than facing away from the workpieces P. The fulcrum washer 78 has a substantially straight face 79 on that side opposite the workpieces P against which the flat surface 80 of the washer 78 bears, this straight face 79 being inclined with respect to the flat surface 80. The washers 76 are inserted over a locking bolt 11 so that the concave sides thereof face the workpieces P, this being effective to cause the outermost edges of the washers 76 to contact the fulcrum washer 78. The inside edges of the washers 76, however, do not contact the inside edge of the fulcrum washer 78 but are spaced therefrom.

Figure 13:
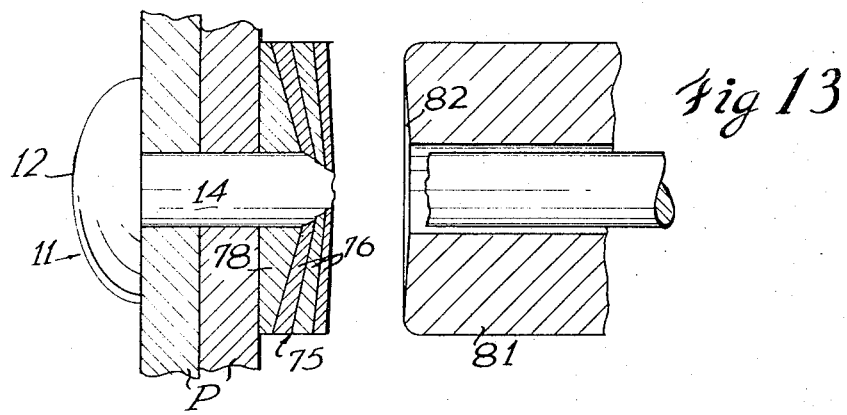
FIG. 13 is a cross-sectional view of the embodiment shown in FIG. 12 after the locking assembly has been locked onto the locking bolt.

An anvil 81 having a straight, slightly conical or concave pressing surface 82 is used in connection with the washers 76 of this modification. The anvil 81, when applied to the locking bolt 11 in the same manner as the other embodiments of the invention, forces the washers 76 inwardly at their innermost edges until the washer 76 adjacent the fulcrum washer 78 becomes contiguous with the inclined face 79 of the fulcrum washer 78. This is effective to cause the inside diameter of the washers 76 to decrease and thereby cause the innermost edges of the washers 76 to engage and lock the locking bolt 11 in place. By making the outermost washer 76 with a slightly smaller innermost diameter, this washer 76 will score the shank 14 sufficiently to cause it to fail at the notched portion and permit the removal of the unused portion of the bolt 11. The assembled locking bolt 11 and locking assembly 75 are shown at FIG. 13.

Figure 14:
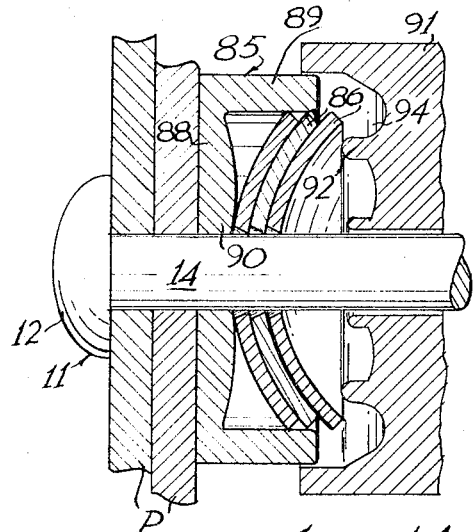
FIG. 14 is a cross-sectional view of a second modification of the third embodiment of the invention showing the locking assembly therefor just prior to being locked onto the locking bolt.
Figure 15:
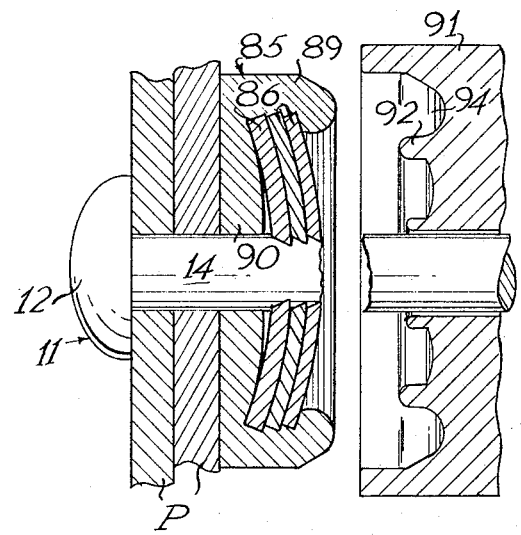
FIG. 15 is a cross-sectional view of that embodiment of the invention shown in FIG. 14 after the locking assembly has been locked onto the locking bolt.

A locking assembly 85 which is a second modification of the third embodiment of the invention is shown in FIG. 14 and comprises a plurality of conical washers 86 similar to the washers 61 shown in FIG. 10 and a fulcrum washer 88 similar to the fulcrum washer 62 shown in FIG. 10 but having an annular extension 89 at the outermost peripheral edge thereof. The extension 89 extends substantially perpendicularly to the fulcrum washer 88 from the pivoting surface 69 of the washer 88 and over the conical washers 86 when they are in position. The flat side 90 of the fulcrum washer 88 fits against the workpieces P as is shown in FIG. 14 and the entire assembly 85 is placed around the shank 14 a locking bolt 11 in the same manner as that embodiment of the invention shown in FIG. 10. An anvil 91 which is to be used with this modification of the invention is shaped somewhat differently from the anvil 70 of FIG. 10. The anvil 91 has two portions thereof, a setting portion 92 which serves to fold the washers 86 over the fulcrum washer 88 as was done in the embodiment of the invention shown in FIG. 10, and a forming portion 94 which is effective to engage the annular extension 89 extending from the fulcrum washer 88 and fold the ends thereof over the edge of the outermost washer 86 when it is in the position that is folded over the fulcrum washer 88. This is effective to lock the conical washers 86 in place so that they may be used under loads where extremely high shock forces and vibration are encountered.

Figure 16:
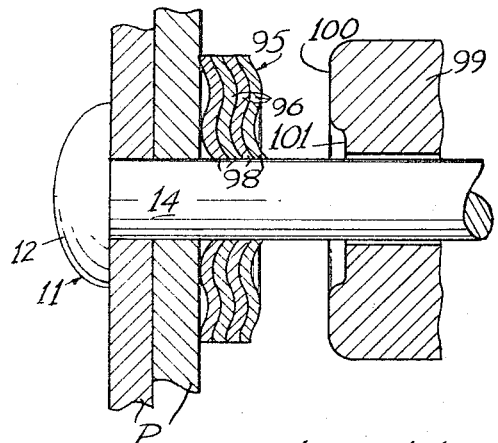
FIG. 16 is a cross-sectional view of a fourth embodiment of the invention shown with the locking assembly therefor just prior to being locked onto the locking bolt; and, FIG. 17 is a cross-sectional view of that embodiment of the invention shown in FIG. 16 after the locking assembly therefor has been locked onto the locking bolt.

A series of annular washers 95 shown in FIG. 16 comprises a fourth embodiment of the invention. The shape of the washers 95 is determined by rotating about a central axis a cross-sectional shape of a thin rectangular member having bent therein a first offset portion approximately midway its length and an outwardly turned portion at one end thereof. The cross-sectional shape is spaced from the central axis, has its greatest length perpendicular to the central axis and has its outwardly turned end nearest the central axis. Therefore, it can be seen that the washers 95 have an offset portion 96 and an outwardly turned sharpened inner edge 98.

The inside diameter of the washers 95 is just sufficient to permit them to be placed over the shank 14 of the locking bolt 11 after it has been inserted through the workpieces P. The washers 95 are inserted over the shank 14 so that the outwardly turned inner edge 96 faces away from the workpieces P as shown in FIG. 16.

Figure 17:
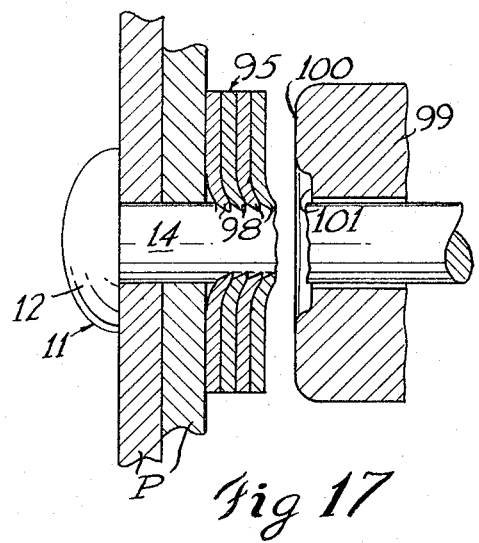

An anvil 99 to be used with the washers 95 has a substantially flat annular load area 100 effective to overlie and engage the offset portion 96 of the washers 95. When the pulling jaws of the conventional lockbolt gun (not shown) used in conjunction with the anvil 99 engage and preload the bolt 11 to a predetermined amount, the load area 100 causes the offset portion 96 to flatten as shown in FIG. 17. This is effective to decrease the inside diameter of the washers 95 and cause their inner edges 98 to engage and bite into the shank 14. A recess 101 in the face of the anvil 99 adjacent the shank 14 forces the inner edges 98 of the washers 96 into the shank 14 as they are forced inwardly.

Since the outermost washer 95 moves more as it is flattened, the inner edge 98 thereof notches the bolt sufficiently to cause it to fail at the notch and terminate the locking operation. The anvil 99 and unused portion of the shank 14 are removed leaving the bolt 11 rigidly held in place by washers 95.

Figure 18:
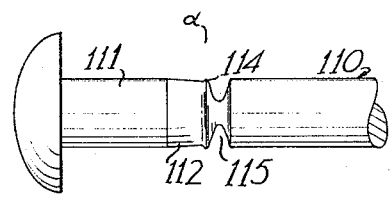
FIG. 18 is a view of a modification of the locking bolt of FIG. 1.

All of the embodiments of the invention disclosed heretofore have included a locking bolt 11 having a plain or knurled shank 14. It is to be understood, however, that conventional locking bolts may be used with the washers 16, 61, 76 and 95. FIG. 18 discloses a special locking bolt 110 for use with the above-mentioned washers which will increase their holding force on the shank 111 of the bolt 110.

This increased holding force is accomplished by a locking groove 112 located in the shank 111 at that point along the shank which is contacted by the washers 16, 61, 76, or 95 to lock the bolt 110 in place. The locking groove 112 is formed into the shank 111 starting in the approximate vicinity of the terminal point of the workpieces P to be fastened together. This groove 112 extends outwardly along the shank 111 and becomes deeper. It must be remembered, however, the groove 112 is extremely shallow even at its deepest point, being only a few thousandths deep thereat. After the groove 112 extends along the shank 111 a predetermined distance as will be explained hereinafter, it slopes outwardly again to the surface of the shank 111 to form an adjustment gripping section 114. The slope of this gripping section 114 is critical, this slope being such that the longitudinal distance α between the deepest portion of the groove 112 and the point at which the gripping section 114 reaches the outer surface of the shank 111 is less than the thickness of one of the washers 16, 61, 76, or 95.

Immediately after the gripping section 114 terminates on the shank 111, a breakneck groove 115 of conventional design is formed in the shank 111. The breakneck groove 115 operates in conventional manner to cause the bolt 110 to fracture at a predetermined tensile force on the bolt 110.

Figure 19:
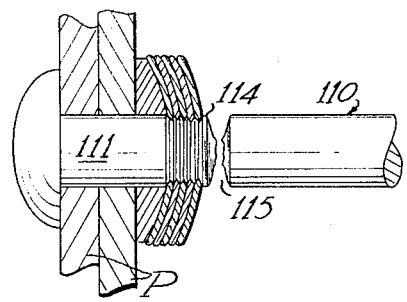
FIG. 19 shows the locking bolt of FIG. 18 being installed in workpieces of minimum thickness.

FIG. 19 shows a locking bolt 110 being used in combination with a locking assembly 60. The length of the locking groove 112 is determined by the thickness and number of washers 61 used. In this case we may assume that the locking groove 112 is long enough to receive five washers 61 when the work-pieces P are at the minimum thickness with which this particular size locking bolt 110 may be used. The depth of the groove 112 is such that the washers 61 always engage the shank 111 in the groove 112 when they are folded back over the fulcrum washer 62. When the workpieces P are at this minimum thickness, the washer 61 most removed from the workpieces P engages the groove 112 at its deepest point adjacent the gripping section 114. As can easily be seen in FIG. 19, the gripping section 114 must be broken away in addition to the metal into which the edges 65 are embedded thereby requiring a much greater force to tear the locking assembly 60 from the shank 14.

Figure 20:
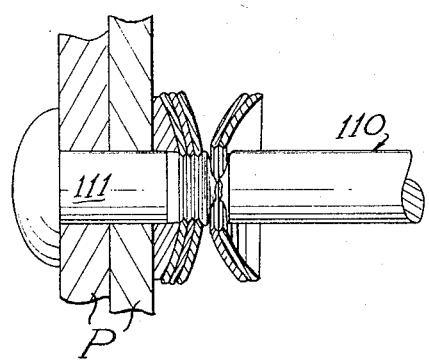
FIG. 20 shows the locking bolt of FIG. 18 being installed in workpieces of maximum thickness.

FIG. 20 discloses the locking bolt 110 and locking assembly 60 being used with workpieces P having a maximum permissible thickness. The sloped gripping section 114 is less than the thickness of a washer 61 and is effective to rigidly lock the assembly 60 onto the shank 111 since the washer 61 which engages the section 114 can do so at any point along its length. As the workpieces P increase, in thickness, fewer washers 61 engage the shank 111 since any outermost washers 61 that do not engage the gripping section 114 slips into the breakneck groove 115 and drops from the locked assembly with the anvil 70.

It will be obvious to those skilled in the art that many variations may be made in the embodiments herein chosen for the purpose of illustrating the invention without departing from the scope thereof as defined by the appended claims.

What is claimed as invention is:

1. In a fastener, a locking bolt with an enlarged head and a continuous elongated shank insertable through aligned holes in a plurality of workpieces; locking means slidably positioned on said shank on the opposite side of said plurality of workpieces from said head, said locking means including a plurality of continuous annular conical washers nested together and surrounding said shank, the inner diameter of said washers being substantially equal to the diameter of said shank with the washer most remote from said head having an inner diameter which is slightly smaller than that of the remainder of said washers, the inner periphery of said washers being sharpened to form a cutting edge, each washer being deformable from its initial conical configuration into a plurality of successive locking configurations in each of which its inner edge has progressively smaller diameters; and means for simultaneously deforming said washers upon application of a force to said washers parallel to said shank, whereby said most remote washer is deformed into a final locking configuration wherein its inner edge cuts into said shank by an amount that results in fracture of said shank, and whereby at least one other of said washers is deformed into a final locking configuration in which its inner edge has a diameter sufficiently small to cause said inner edge to cut into said shank by an amount that restricts movement of said shank with respect to said workpieces but does not result in fracture of said shank.

2. In a fastener as set forth in claim 1 wherein said means for simultaneously deforming said annular members is a fulcrum washer having one flat side and one convex side, said convex side being positioned adjacent said annular members.

3. In a fastener as set forth in claim 2 further including means for retaining each of said annular members in a locking configuration.

References Cited

UNITED STATES PATENTS

| 675,664 | 6/1901 | Moore | 85—36 |
| 1,192,404 | 7/1916 | Ewart | 85—7 |
| 2,264,480 | 12/1941 | Owen | 85—36 |
| 2,421,115 | 5/1947 | Carlson | 85—8.6 |
| 2,521,567 | 9/1950 | Corrigan et al. | 85—33 |
| 2,744,436 | 5/1956 | Ross | 85—36 |
| 2,781,658 | 2/1957 | Dobell | 85—36 |
| 3,203,300 | 8/1965 | Marschner | 87—5 |

FOREIGN PATENTS

| 815,258 | 4/1937 | France. |

CARL W. TOMLIN, *Primary Examiner.*

EDWARD C. ALLEN, *Examiner.*

R. S. BRITTS, *Assistant Examiner.*